US006932381B2

United States Patent
Cowelchuk

(10) Patent No.: US 6,932,381 B2
(45) Date of Patent: Aug. 23, 2005

(54) AIR BAG ASSEMBLY WITH DOOR SUPPORT

(75) Inventor: Glenn A. Cowelchuk, Chesterfield, MI (US)

(73) Assignee: Lear Corporation, Southfield, MI (US)

( * ) Notice: Subject to any disclaimer, the term of this patent is extended or adjusted under 35 U.S.C. 154(b) by 124 days.

(21) Appl. No.: 10/330,789

(22) Filed: Dec. 27, 2002

(65) Prior Publication Data

US 2004/0124613 A1 Jul. 1, 2004

(51) Int. Cl.⁷ .............................................. B60R 21/20
(52) U.S. Cl. .................................... 280/732; 280/728.2
(58) Field of Search ...................... 280/728.2, 728.3, 280/731, 732

(56) References Cited

U.S. PATENT DOCUMENTS

| | | | |
|---|---|---|---|
| 5,069,480 A | | 12/1991 | Good |
| 5,275,432 A | | 1/1994 | Pray et al. |
| 5,362,096 A | * | 11/1994 | Satoh et al. ............. 280/728.3 |
| 5,398,959 A | | 3/1995 | Avila |
| 5,431,432 A | | 7/1995 | Webber et al. |
| 5,441,299 A | * | 8/1995 | Lauritzen et al. ........ 280/728.2 |
| 5,456,487 A | | 10/1995 | Daris et al. |
| 5,527,064 A | * | 6/1996 | Kai et al. ................ 280/728.2 |
| 5,556,126 A | * | 9/1996 | Lee .......................... 280/728.3 |
| 5,582,422 A | * | 12/1996 | Kelley et al. ............. 280/728.2 |
| 5,584,502 A | | 12/1996 | Phillion et al. |
| 5,681,051 A | | 10/1997 | Phillion |
| 5,738,366 A | | 4/1998 | Phillion |
| 6,070,901 A | | 6/2000 | Hazell et al. |
| 6,092,835 A | * | 7/2000 | Thakore et al. .......... 280/728.3 |
| 6,120,056 A | | 9/2000 | Ryan et al. |
| 6,189,916 B1 | | 2/2001 | Bowers et al. |
| 6,378,894 B1 | | 4/2002 | Trevino et al. |
| 2002/0043788 A1 | | 4/2002 | Gallagher et al. |
| 2002/0043792 A1 | | 4/2002 | Keshavaraj |

FOREIGN PATENT DOCUMENTS

| | | |
|---|---|---|
| EP | 0 646 501 A1 | 4/1995 |
| GB | 2 314 301 A | 12/1997 |
| JP | 2158444 A | 6/1990 |
| JP | 7-221413 | 8/1995 |
| JP | 2000127883 A | 5/2000 |

* cited by examiner

Primary Examiner—David R. Dunn
(74) Attorney, Agent, or Firm—Brooks Kushman P.C.

(57) ABSTRACT

A vehicular air bag assembly includes at least one rib extending from an air bag opening. The rib guides the air bag during deployment. The rib may also support an air bag door. Fingers extending from a panel into the air bag opening may be used to support the air bag door, either together with or instead of the rib. The rib then separates the fingers from the air bag during air bag deployment.

18 Claims, 3 Drawing Sheets

AIR BAG ASSEMBLY WITH DOOR SUPPORT

BACKGROUND OF THE INVENTION

1. Field of the Invention

The present invention relates to air bag assemblies used to protect occupants in automotive vehicles.

2. Background Art

Air bags are being installed in automotive vehicles with increasing frequency. Air bag assemblies typically include an inflatable bag coupled to an inflating device which inflates the bag when appropriate conditions are detected. For example, a front impact of sufficient strength will inflate air bags to protect front seat occupants from head injury. Air bags are typically concealed behind a door built into a panel. The panel may be part of an instrument panel, a door panel, a steering wheel, a headliner, and the like. The panel and door are frequently covered with a skin which protects the air bag assembly and provides a decorative coating for the panel. When the air bag deploys, the air bag door is pushed through the skin.

One problem with air bag assemblies is preventing occupant damage to skins and panels by pressing on the skins in the area around the air bag door. This area is typically weaker than surrounding panel areas to permit the air bag door to open.

What is needed is an air bag assembly which provides increased support for panels, air bag doors, and covering skins. Such an air bag assembly should be capable of being constructed using typical manufacturing techniques. In addition, the air bag assembly must appropriately guide the air bag during deployment.

SUMMARY OF THE INVENTION

The present invention provides support for air bag doors and covering skins before air bag deployment. The present invention also guides the air bag through the panel during air bag deployment.

A vehicular air bag assembly is provided. At least one air bag deployment door is formed on a panel. A frame defining an air bag opening defined by opening edges is positioned behind the air bag deployment door. A rib extends from at least one opening edge to support the air bag deployment door when the door is in a closed position over the frame opening. An air bag is positioned to deploy through the air bag opening.

In an embodiment of the present invention, the rib is positioned to guide the air bag as the air bag deploys. The rib may be an extension of a chute positioned to guide air bag deployment.

In another embodiment of the present invention, the rib extends substantially around at least three sides of the air bag opening.

In still another embodiment of the present invention, the at least one air bag deployment door includes a metal backing plate on an inside portion of the door and a skin on an outside portion of the door. The deployment door may be part of a panel assembly such as an instrument panel, a door panel, or the like. The skin may be formed as part of the panel assembly. A spacer layer may be formed between the metal backing plate and the skin.

In a further embodiment of the present invention, fingers on the panel support the air bag door when the door is closed. The rib may separate the fingers from the air bag during air bag deployment.

A method of making a vehicular air bag assembly is also provided. A panel is formed to be part of the interior of a vehicle. The panel defines an air bag opening. A door assembly is fastened to the panel outer face. The door assembly includes an air bag door positioned over the air bag opening. An air bag chute is formed having a chute opening and a rib extending from the chute opening. The air bag chute is fastened to the panel inner face such that the chute opening aligns with the air bag opening and such that the rib supports the air bag door. An air bag module is fastened to the panel such that the air bag, when deployed, travels down the air bag chute, through the chute opening, through the air bag opening and through the air bag door.

Another method of making a vehicular air bag assembly provides for forming a panel defining at least one finger extending into the air bag opening. The door assembly is fastened to the panel outer face so as to be supported by the at least one finger. An air bag chute is formed having a chute opening and a rib extending from the chute opening. The air bag chute is fastened to the panel interface such that the chute aligns with the air bag opening and such that the rib separates the at least one finger from the chute opening. An air bag module is fastened to the panel such that the air bag, when deployed, travels down the air bag chute, through the chute opening, through the air bag opening, and through the air bag door without contacting the at least one finger.

The above objects and other objects, features, and advantages of the present invention are readily apparent from the following detailed description of the preferred embodiments when taken in connection with the accompanying drawings.

DETAILED DESCRIPTION OF THE PREFERRED EMBODIMENTS

Figure 1:
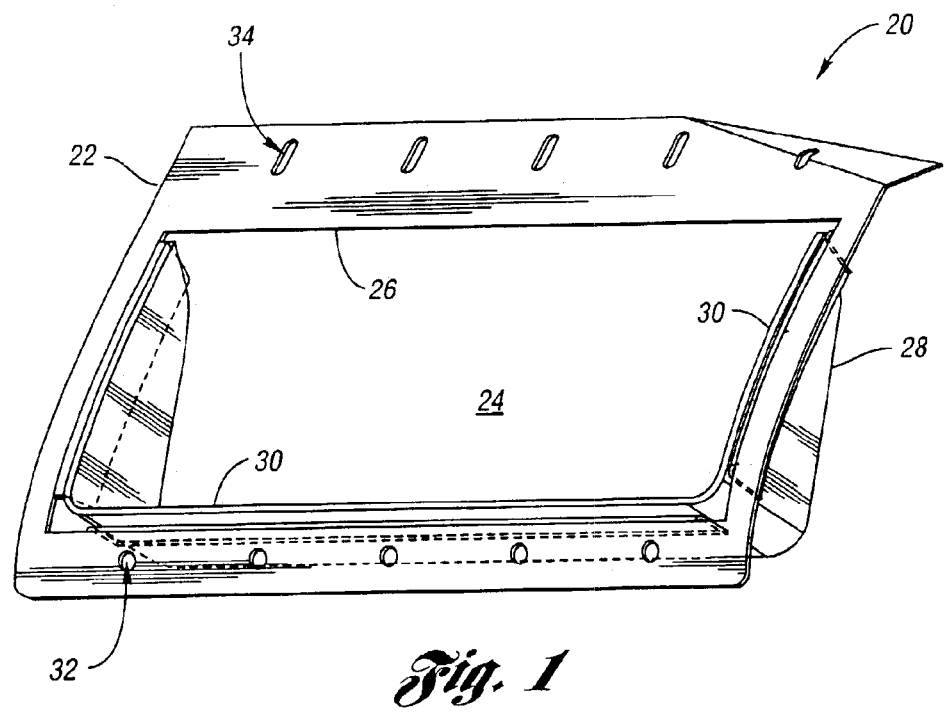
FIG. 1 is a perspective view of an air bag chute according to an embodiment of the present invention.

Referring to FIG. 1, a perspective drawing of an air bag chute assembly according to an embodiment of the present invention is shown. An air bag chute assembly, shown generally by 20, includes frame 22 defining an air bag opening 24. Air bag opening 24 is defined by edges, one of which is indicated by 26. In the embodiment shown, air bag opening 24 is rectangular in shape and is therefore defined by four edges 26. However, any shape for air bag opening 24 falls within the spirit and scope of the present invention.

Air bag chute assembly 20 includes chute guide 28. In the embodiment shown, chute guide 28 is U-shaped, extending around three edges 26 of air bag opening 24. Chute guide 28 is attached to frame 22 so as to form lips 30 extending from edges 26 in air bag opening 24. Alternatively, lips 30 may be formed independently of chute guide 28. In the embodiment shown, three edges 26 of air bag opening 24 include lip 30.

Frame 22, chute guide 28 and lip 30 are preferably made from engineering material, such as steel. In the embodiment shown, chute guide 28 defining lips 30 is spot-welded to frame 22. Holes, one of which is indicated by 32, and slots, one of which is indicated by 34, permit air bag chute assembly to be attached to other elements of a vehicular air bag assembly.

Figure 2:
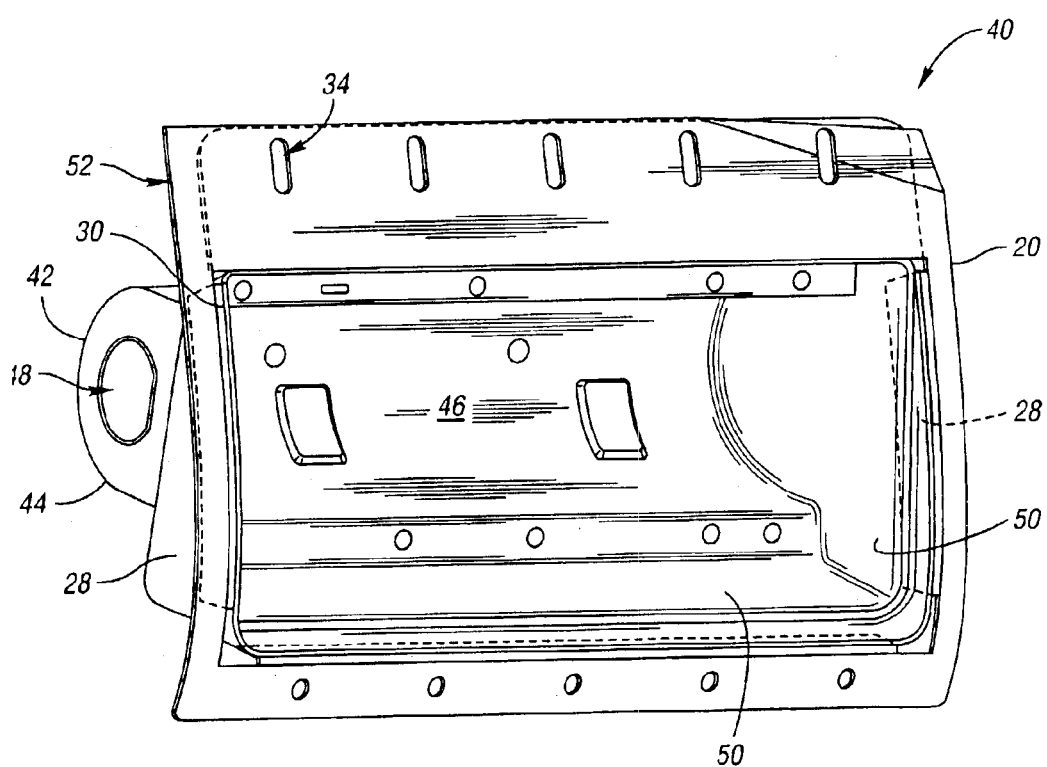
FIG. 2 is a perspective view of an air bag chute and module assembly according to an embodiment of the present invention.

Referring now to FIG. 2, a perspective view of an air bag chute and module assembly according to an embodiment of the present invention is shown. An air bag chute and module assembly, shown generally by 40, includes air bag chute assembly 20 and air bag module 42. Air bag module 42 typically includes an air bag and a canister for inflating the air bag, both of which have been omitted for clarity. Air bag housing 44 encloses the air bag and canister. Air bag housing 44 includes canister portion 46 for holding the canister. Canister portion 46 defines access opening 48 accepting control signals for controlling the canister. Extending from canister portion 46 are air bag walls 50 holding the collapsed air bag.

Air bag module 42 slides into air bag chute assembly 20 so that air bag walls 50 extend partially along chute guide 28. This allows chute guide 28 to channel the air bag when the air bag is deployed. Air bag housing 44 includes attachment plate 52 extending from one air bag wall 50. Attachment plate 52 includes slots which align with air bag chute assembly slots 34 when air bag module 42 is slid into air bag chute assembly 20.

Figure 3:
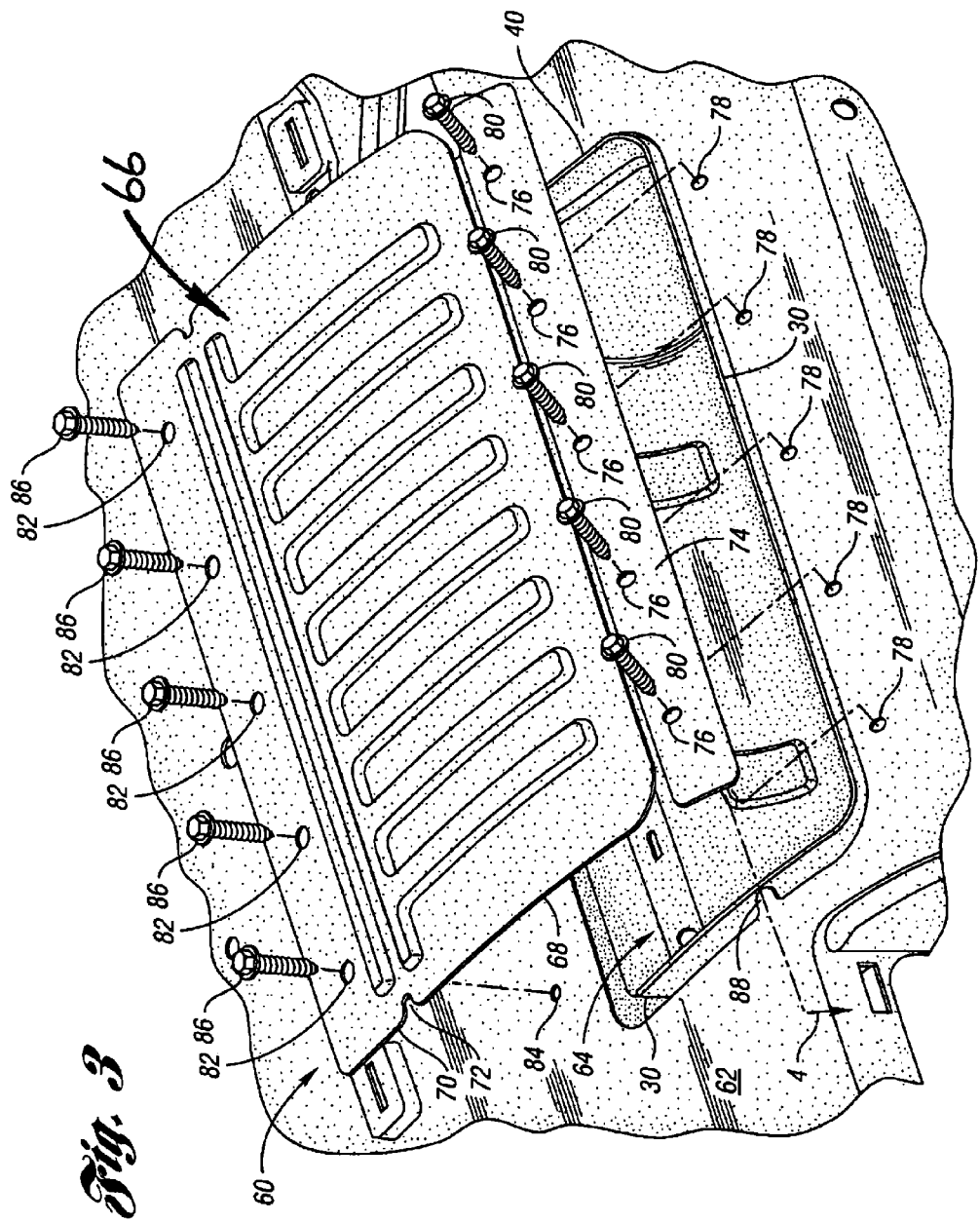
FIG. 3 is an exploded view drawing of a panel assembly including an air bag chute according to an embodiment of the present invention.

Referring now to FIG. 3, an exploded view drawing of a panel assembly including an air bag chute according to an embodiment of the present invention is shown. A panel assembly, shown generally by 60, includes panel 62 defining air bag opening 64. Panel 62 shown in FIG. 3 forms part of an instrument panel assembly. As will be recognized by one of ordinary skill in the art, the present invention applies to a wide variety of air bag applications including panels in doors, steering wheels, headliners, pillars, seat backs, and the like.

Panel assembly 60 also includes door assembly 66. Door assembly 66 includes air bag door 68 connected to door support 70 by a plurality of hinges, one of which is indicated by 72. Hinges 72 allow air bag door 68 to rotate or open relative to door support 70. Door assembly 66 also includes reinforcement strip 74. Door assembly 66 may be formed from any engineering material such as plastic or metal, but is preferably formed from stamped steel.

Panel assembly 60 further includes air bag chute and module assembly 40 positioned in air bag opening 64. Door assembly 66 is positioned over panel 62 such that air bag door 68 is over air bag opening 64. When the air bag deploys, the air bag expands through air bag opening 64 and pushes open air bag door 68.

Reinforcement strip 74 defines a plurality of holes 76. Similarly, panel 62 defines a plurality of corresponding holes 78. Holes 76, 78 align with holes 32 in air bag chute assembly 20. Fasteners 80 pass through holes 76, 78, 32 to attach reinforcement strip 74, panel 62 and air bag chute and module assembly 40. Door support 70 defines holes 82. Panel 62 defines corresponding holes 84. Holes 82, 84 each align with slot 34 on air bag chute assembly 20 and the mating slot on air bag module 42. Fastener 86 passes through holes 82, 84 and corresponding slots in air bag chute and module assembly 40 to attach door support 70, panel 62 and air bag chute and module assembly 40. Fasteners 80, 86 are preferably bolts onto which nuts, not shown, are tightened. However, other forms of mechanical attachment are readily known in the art.

Lip 30 on air bag chute assembly 20 guides the air bag through panel 62 upon air bag deployment. In one embodiment, lip 30 also provides support for air bag door 68 when air bag door 68 is in the closed position. Alternatively, or in addition to lip 30, one or more fingers 88 may be formed on panel 62 extending into air bag opening 64. Air bag door 68 rests on each finger 88 when air bag door 68 is in the closed position. In this embodiment, lip 30 prevents the air bag from breaking finger 88 when the air bag deploys through air bag opening 64.

Figure 4:
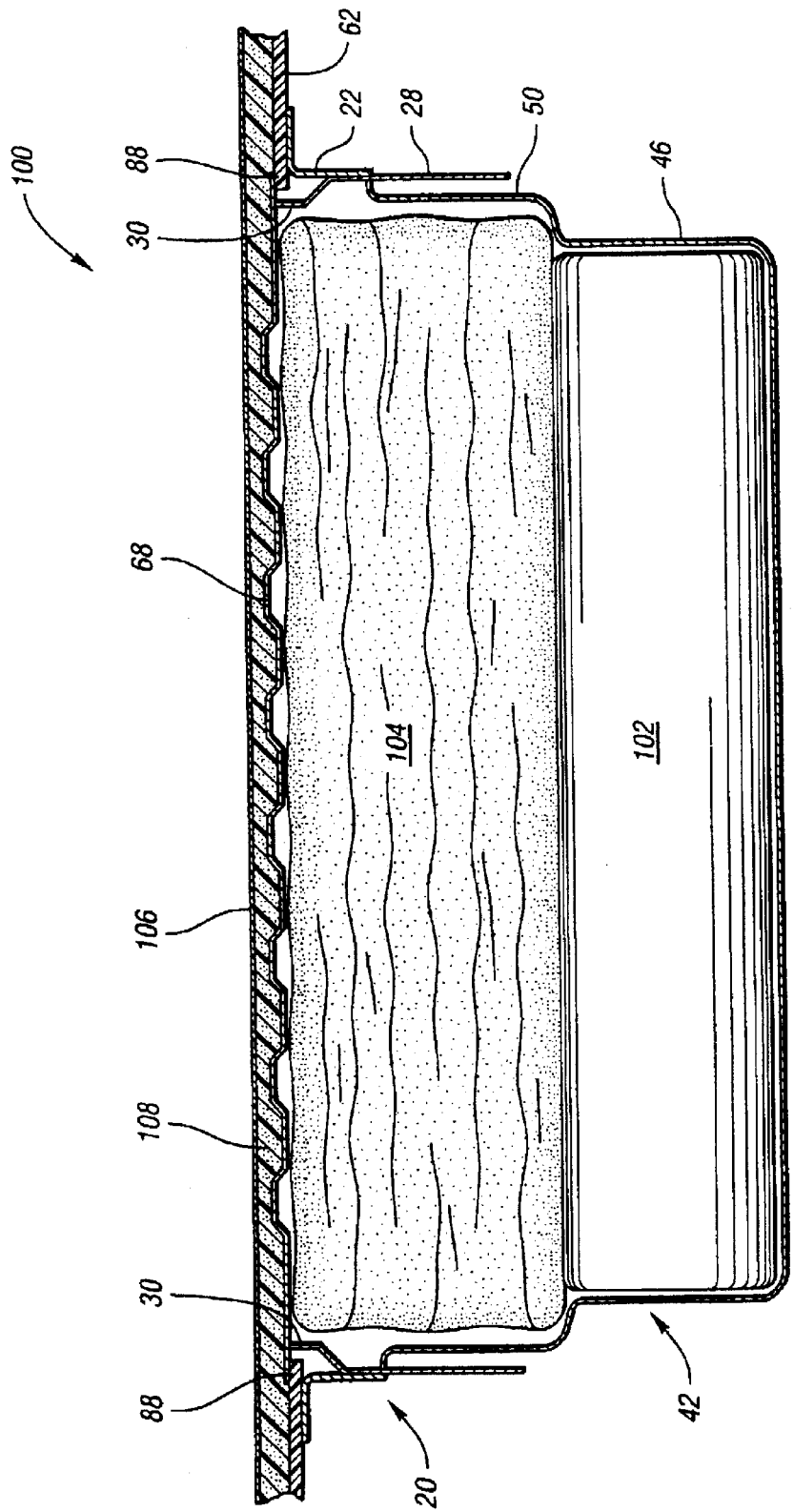
FIG. 4 is a cross-sectional drawing of an air bag assembly according to an embodiment of the present invention.

Referring now to FIG. 4, a cross-sectional drawing of an air bag assembly according to an embodiment of the present invention is shown. An air bag assembly, shown generally by 100, includes air bag canister 102 and air bag 104 within air bag module 42. Air bag canister 102 sits in canister portion 46. A typical air bag canister is model P4.4 inflation cylinder from TRW. Air bag 104 sits within air bag walls 50. Air bag 104 may be attached to an inside surface of air bag door 68 or may be unattached to door 68.

Air bag assembly 100 may include skin 106 covering air bag door 68 and panel 62. Skin 106 protects panel 62 and provides decorative coating. Skin 106 may be constructed as a spray urethane aromatic. Foam layer 108 separates skin 106 from door 68 and panel 62. Foam layer 108 may be formed with urethane foam.

In the embodiment illustrated in FIG. 4, door 68 is supported by lips 30 of air bag chute assembly 20 as well as fingers 88 extending from panel 62. In addition, lips 30 separate fingers 88 from air bag 104. When air bag 104 deploys through door 68, air bag 104 will not break fingers 88 from panel 62.

Panel 62 may be molded or stamped from any suitably rigid engineering material such as, for example, Dylark® from Nova Chemicals Corporation. The design of air bag module 42 depends upon the placement of air bag assembly 100 within a vehicle, the impacts expected on inflated air bag 104, and the like. Air bag modules 42 are available from a variety of manufacturers, such as TRW, Autolive, Takata, and the like.

Fasteners 80, 86 are placed through door assembly 66 and panel 62. Fasteners 80, 86 may be permanently attached to door assembly 66, may be held by adhesive to door assembly 66, or may include mechanical snap mechanisms to temporarily or permanently hold fasteners 80, 86 to door assembly 66. Panel 62, together with door assembly 66, is placed in a fixture spaced apart from skin 106. Foam layer 108 is then formed between skin 106 and panel 62 by a "foam-in-place" process as is well known in the art. Air bag chute assembly 20 is placed over fasteners 80,86. Air bag module 42 is slid into chute guide 28 and onto fasteners 86. Bolts are placed on fasteners 80, 86 to complete air bag assembly 100.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A vehicular air bag assembly comprising:
   at least one air bag door formed as part of a door assembly including a hinge permitting the air bag door to open, the at least one air bag door part of a panel assembly having fingers supporting the air bag door when the air bag door is closed;
   a frame defining an air bag opening, the opening defined by opening edges, the frame rigidly attached to the door assembly such that the opening is positioned behind the at least one air bag door;

a rib rigidly attached to the frame, the rib extending through at least one opening edge beyond the frame, the rib supporting the at least one air bag door when the air bag door is in a closed position over the frame opening; and an air bag positioned to deploy through the air bag opening.

2. A vehicular air bag assembly as in claim 1 wherein the rib is positioned to guide the air bag as the air bag deploys.

3. A vehicular air bag assembly as in claim 1 wherein the rib extends substantially around at least three sides of the air bag opening.

4. A vehicular air bag assembly as in claim 1 wherein the at least one air bag door comprises a metal backing plate on an inside portion of the air bag door and a skin on an outside portion of the air bag door.

5. A vehicular air bag assembly as in claim 1 wherein the panel assembly is an instrument panel.

6. A vehicular air bag assembly as in claim 1 wherein the panel assembly is a door panel.

7. A vehicular air bag assembly as in claim 1 wherein the skin is formed as part of the panel assembly.

8. A vehicular air bag assembly as in claim 1 further comprising a spacer layer between the metal backing plate and the skin.

9. A vehicular air bag assembly as in claim 1 wherein the rib separates the fingers from the air bag during air bag deployment.

10. A vehicular air bag assembly as in claim 4 further comprising a spacer layer between the metal backing plate and the skin.

11. A vehicular air bag assembly as in claim 10 wherein the spacer layer is a foam layer.

12. A vehicular air bag assembly as in claim 1 wherein the rib is an extension of a chute operative to guide the air bag during air bag deployment.

13. A method of making a vehicular air bag assembly comprising:

forming a panel to be part of the interior of a vehicle, the panel defining an air bag opening having fingers extending therein, the panel having an inner face and an outer face;

fastening a door assembly to the panel outer face, the door assembly including an air bag door positioned over the air bag opening, the door assembly including a door positioned over the fingers;

forming an air bag chute having a chute opening, the chute opening formed by a chute frame extending away from the chute, the chute having a rib extending from the chute opening beyond the chute frame;

rigidly fastening the chute frame to the panel inner face such that the chute opening aligns with the air bag opening and such that the rib supports the air bag door; and fastening an air bag module to the panel such that the air bag, when deployed, travels down the air bag chute, through the chute opening guided by the rib, through the air bag opening and through the air bag door.

14. A method of making a vehicular air bag assembly as in claim 13 further comprising:

forming a skin for covering the panel; and forming a foam layer between the skin and the panel.

15. A method of making a vehicular air bag assembly comprising:

forming a panel to be part of the interior of a vehicle, the panel defining an air bag opening, the panel having an inner face and an outer face, the panel defining at least one finger extending into the air bag opening;

fastening a door assembly to the panel outer face, the door assembly including an air bag door positioned over the air bag opening, the air bag door supported by the at least one finger;

forming an air bag chute having a chute opening, the chute opening formed by a chute frame extending away from the chute, the chute having a rib extending from the chute opening beyond the chute frame;

rigidly fastening the chute frame to the panel inner face such that the chute opening aligns with the air bag opening and such that the rib separates the at least one finger from the chute opening; and fastening an air bag module to the panel such that the air bag, when deployed, travels down the air bag chute, through the chute opening guided by the rib, through the air bag opening and through the air bag door without contacting the at least one finger.

16. A method of making a vehicular air bag assembly as in claim 15 further comprising:

forming a skin for covering the panel; and forming a foam layer between the skin and the panel.

17. A system comprising:

a frame having a top surface and a back surface, the frame defining a frame opening through the frame, the frame including a plurality of attachment holes, an air bag chute having at least three chute sides defining a channel, the air bag chute rigidly attached to the frame such that a majority of the chute extends from the frame back surface and a small portion of the chute extends from the frame front surface, the chute sides on the small portion of the chute forming a lip extending from the frame top surface;

an air bag module having module sides fit into the majority of the chute extending from the frame back surface;

whereby the frame, the air bag chute and the air bag module form an air bag assembly for holding an air bag that is not deployed;

a panel defining a panel opening through which the air bag may deploy, the panel having at least one finger extending into the panel opening; and an air bag door covering the panel opening, the air bag door prevented from moving into the panel opening by the at least one finger;

wherein the air bag assembly is rigidly attached to the panel using the attachment holes such that the lip prevents the air bag from contacting the at least one finger when the air bag deploys.

18. A system comprising:

a frame having a top surface and a back surface, the frame defining a frame opening through the frame, the frame including a plurality of attachment holes, an air bag chute having at least three chute sides defining a channel, the air bag chute rigidly attached to the frame such that a majority of the chute extends from the frame back surface and a small portion of the chute extends from the frame front surface, the chute sides on the small portion of the chute forming a lip extending from the frame top surface;

an air bag module having module sides fit into the majority of the chute extending from the frame back surface;

whereby the frame, the air bag chute and the air bag module form an air bag assembly for holding an air bag that is not deployed;

a panel defining a panel opening through which the air bag may deploy; and an air bag door covering the panel opening;

wherein the air bag assembly is rigidly attached to the panel using the attachment holes such that the lip prevents the air bag door from moving through the panel opening.

* * * * *